March 31, 1931. H. E. TAYLOR 1,798,230
MACHINE FOR CUTTING GEARS
Filed Aug. 8, 1928 2 Sheets-Sheet 1

INVENTOR
Herbert E. Taylor
BY
ATTORNEY

March 31, 1931.  H. E. TAYLOR  1,798,230
MACHINE FOR CUTTING GEARS
Filed Aug. 8, 1928   2 Sheets-Sheet 2
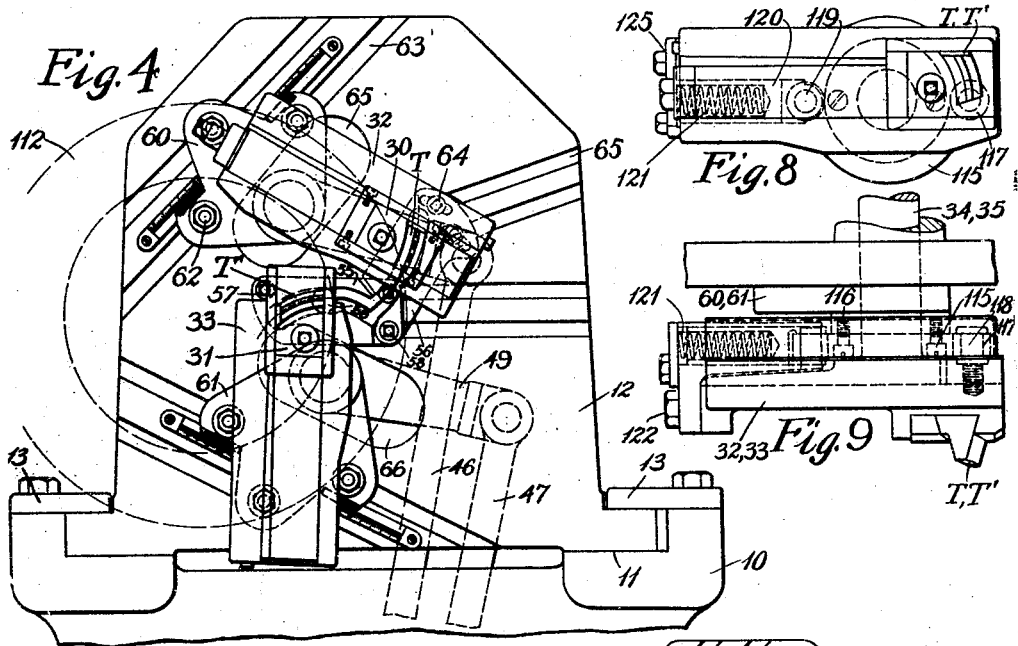
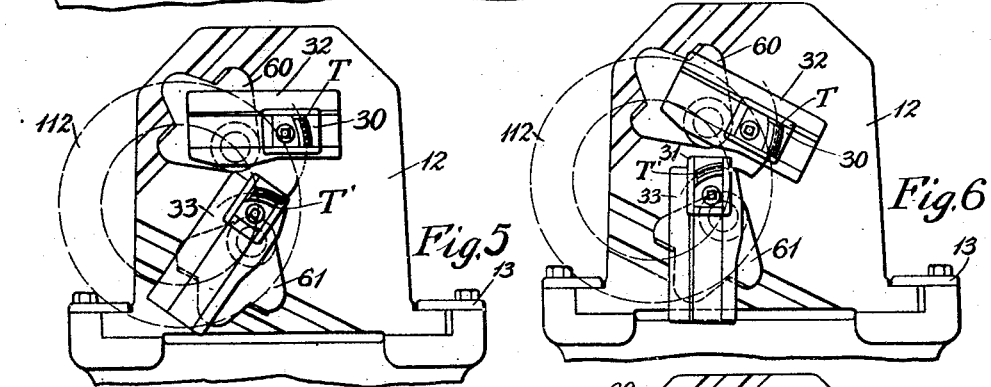
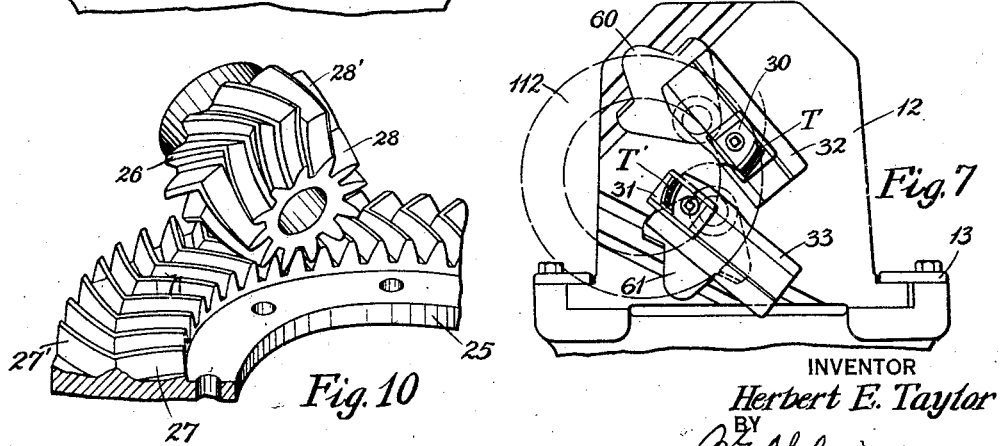
INVENTOR
Herbert E. Taylor
BY
ATTORNEY Patented Mar. 31, 1931

1,798,230

UNITED STATES PATENT OFFICE

HERBERT EDGAR TAYLOR, OF COVENTRY, ENGLAND, ASSIGNOR TO GLEASON WORKS, OF ROCHESTER, NEW YORK, A CORPORATION OF NEW YORK

MACHINE FOR CUTTING GEARS

Application filed August 8, 1928. Serial No. 298,387.

The present invention relates to a machine for producing gears and particularly to a machine for cutting herringbone bevel gears in a generating operation. In a more particular aspect, the present invention relates to a machine for generating herringbone bevel gears in which the two halves of the teeth are of involute curvature lengthwise.

The primary object of this invention is to provide an efficient form of machine for cutting gears and particularly tapered gears with herringbone or double-helical teeth. Other objects of the invention will be apparent hereinafter from the specification and from the appended claims.

In the drawings:

Figure 4 is an end view on an enlarged scale of the tool mechanism;

Figure 1:
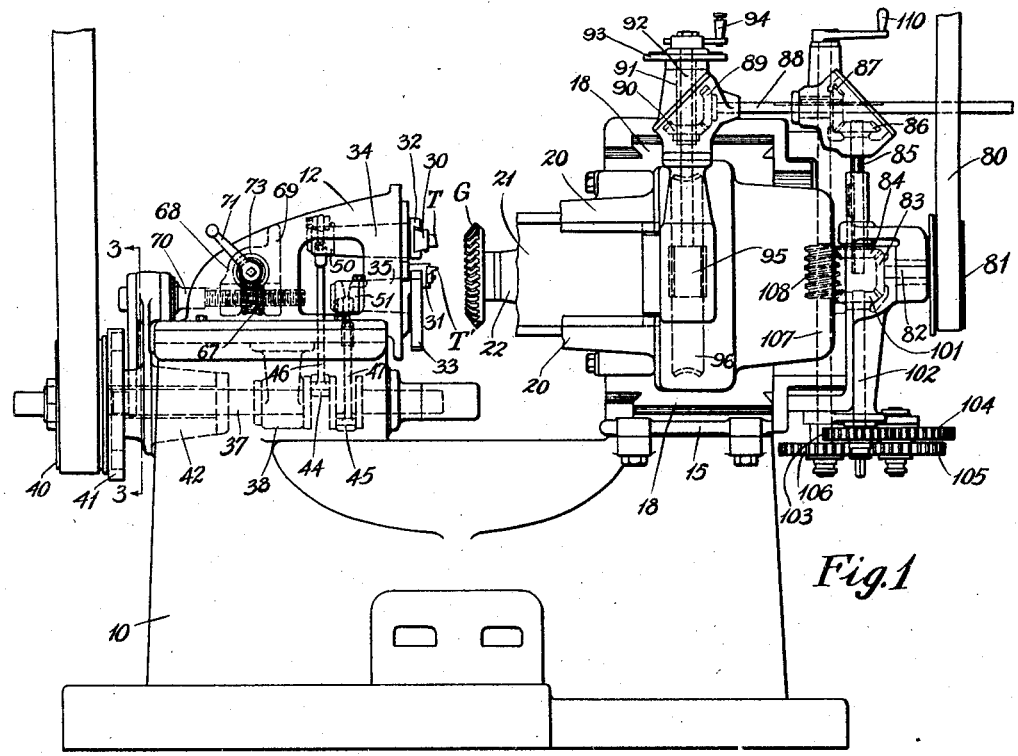
Figure 1 is a side elevation of a machine constructed according to a preferred embodiment of my invention.
Figure 2:
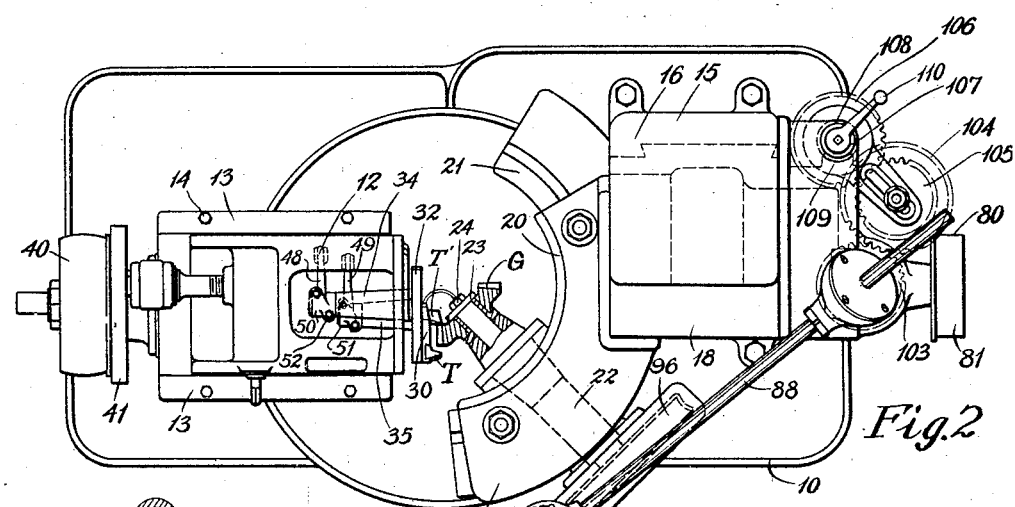
Figure 2 is a plan view of this machine.

Figures 5, 6, and 7 are views illustrating, somewhat diagrammatically, successive steps in the cutting of a herringbone bevel tooth with the apparatus of my invention;

Figures 8 and 9 are an end view and a side elevation, respectively, of a tool holder constructed according to an alternative form of my invention; and Figure 10 is a fragmentary perspective view of a pair of herringbone bevel gears such as might be cut on a machine constructed according to this invention.

Referring now to the drawings by numerals of reference, 10 indicates the base or frame of the machine. This base is provided at one end with guide ways 11 (Fig. 4) on which the tool slide or head 12 moves, the tool slide being held on the ways 11 by means of the gibs 13 which are detachably secured to the base or frame 10 by the bolts 14.

Secured to the base 10 at its opposite end is a saddle 15 formed with semi-circular guide rails 16 in which the cradle or oscillatory work carrier 18 moves.

Secured to the cradle is a pair of arms or brackets 20 between which the angularly adjustable work head or slide 21 is mounted and secured in any adjusted position. The work spindle 22 is journaled in the work head 21 and the gear blank G to be cut is secured to the work spindle by any suitable means as, for instance, the washer 23 and bolt 24.

With the present invention, a pair of cutting tools T and T' are employed for cutting the teeth, said tools being constructed to cut from opposite sides of the gear blank G to the center of its face. The cutting motion of the tools is an oscillatory motion so that the two halves of the herringbone teeth will be curved lengthwise. Preferably the axes about which the tools oscillate are so arranged relatively to each other that the two halves of the herringbone teeth are of opposite hand. The result attained is clearly illustrated in Figure 10 in which I have shown a bevel gear pair such as might be generated on the machine illustrated.

In this figure, the gear is designated at 25 and the pinion at 26. The teeth of both members are preferably generated and the two halves of the teeth of both are curved on opposite hands, thus the inner halves 27 of the teeth of the gear 25 are of left hand while the outer halves 27' of these teeth are right handed. The pinion has teeth, the inner halves 28 of which are right handed and the outer halves 28' of which are left handed. This construction has been found to afford a tooth in which the two halves come sharply to a point in the center of the face and which conforms to the usual principles for the construction of spiral teeth. This construction lends itself readily, moreover, to the production of teeth, the halves of which are of involute curvature lengthwise, which is the form of tooth preferably cut on machines constructed according to this invention, as the two halves of the teeth may thus be cut as involutes of the same base circle.

The tools T and T' are secured in tool holders 30 and 31, respectively, which are slidably mounted on the oscillatable arms 32 and 33, respectively. The tool arms 32 and 33 are secured to or formed integral with spindles 34 and 35, respectively, which are journaled in the tool carriers or plates 60 and 61, respectively.

The spindles 34 and 35 are oscillated from the crank shaft 37 to simultaneously oscillate the tools T and T' to cut the two halves of the herringbone teeth on the blank G. The crank shaft 37 is journaled in a bearing 38 secured to the tool slide 12 and has a splined connection with the driving pulley 40, the cam 41 and the bearing or guide 42 which is secured to the base or frame 10. The shaft 37 moves axially with the movement of the slide 12 for feeding the tools into depth, for withdrawing the tools from engagement with the blank after each tooth space has been cut to full depth, and for moving the tools into cutting position and relieving them from cutting position after each cutting stroke, as will be described more fully hereinafter.

The crank shaft 37 is formed with a pair of cranks 44 and 45 which are preferably angularly separated from each other to provide an alternate cutting movement of the tools and which are connected by means of the connecting rods 46 and 47, respectively, with the levers 48 and 49, respectively. The levers 48 and 49 are secured, respectively, to sleeves 50 and 51 which can be clamped by means of the bolts 52 to the spindles 34 and 35 respectively. When the pulley 40 is rotated, then, it will be seen that the tools T and T' will be oscillated from the crank shaft 37 through the connecting rods 46 and 47, the levers 48 and 49, the spindles 34 and 35 and the arms 32 and 33.

As already stated, I prefer to cut the two halves of the teeth of a pair of herringbone gears of involute lengthwise curvature. For this purpose, the tools are moved toward and from their respective axes of oscillation during their oscillatory movements. This may be effected in any suitable manner as by means of a stationary cam which may be secured to the slide 12. Thus, as shown in Figure 4, there is a plate 55 secured to the face of the slide 12 which is made in two parts, one of which 56 is pivotable on the other 57 and may be secured in any adjusted position thereon by means of the bolts 58. Each of the sections of this plate 55 is slotted, and the tool holders 30 and 31 carry rollers 59 which move in these slots. Only one of the rollers is shown in Figure 4 for the sake of clearness. The two slots join each other. The acting parts of these slots are preferably made of involute curvature, while the inactive portions may be curved on circular arcs and are merely provided to allow for the swing of the tool arms. From the construction described, it will be seen that as the tool arms 32 and 33 are oscillated from the crank shaft 37, the tool holders 30 and 31 will be moved toward and away from their respective axes of oscillation to cause the tools to trace or cut involute curves on the gear blank. The plates 60 and 61 in which the spindles 34 and 35 are journaled are adjustable on the face of the slide 12 to permit cutting gears of different cone distances. Suitable scales can be provided as shown to permit setting these plates to the proper positions and the plates may be secured in any adjusted position by means of the bolts 62 which engage in T-slots 63 formed in the face of the slide 12. The slide 12 is slotted at 65 and 66 to permit of movement of the spindles 34 and 35 in the last described adjustment. The cam plate 55 may be adjusted with the plates 60 and 61 for the same purpose and can be secured in any adjusted position by means of the T-bolts 64 which engage in T-slots 65 formed in the face of the slide 12.

The tools can be fed into depth and withdrawn from depth by moving the slide 12 by rotating the nut 67 which is secured between the two arms 68 and 69 which are formed integral with the slide 12 and depend centrally therefrom. This nut 67 is in threaded engagement with a screw 70 and can be rotated by hand from the lever 71 through the worm 73 which meshes with a worm wheel that is secured to the periphery of the nut.

Figure 3:
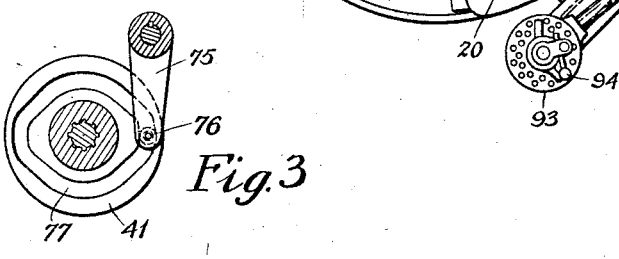
Figure 3 is a section on the line 3—3 of Figure 1 showing a detail of the tool relieving mechanism.

The tools are moved into cutting position for the cutting stroke and relieved or moved away from the blank during the idle or return stroke by moving the screw 70 longitudinally. This last named movement can be effected from the cam 41 (Figs. 1 and 3) which is mounted on the crank shaft 37 and which rotates in unison with that shaft. A lever 75 is in threaded engagement with the screw shaft 70 at one end thereof and carries at its other end a roller 76 which engages in the slot 77 of the cam 71. The cam slot 77 is so formed that the tools will be moved into cutting position and held there for their operating strokes and will be relieved as soon as their respective cuts are completed and held in relieved position on their return or idle stroke. Where the tools are oscillated so as to cut alternately, it will be understood that the length of the tool strokes must be so proportioned that the respective tools will be in relieved and in cutting positions at the proper times.

My invention may be employed in producing gears according to either a generating or a forming process. The machine illustrated is a generator and the blank spindle 22 and cradle 18 are simultaneously moved about their respective axes during cutting to generate the tooth profiles. The required motions are effected from the belt 80 and pulley 81. The pulley is mounted on a shaft 82 which carries a miter gear 83 which meshes with a miter 84 secured to a shaft 85. The shaft 85 carries at its upper end a miter 86 which meshes with a miter 87 which has a splined connection with the shaft 88. This shaft 88 carries a miter 89 meshing with a miter 90 which is keyed to a sleeve 91 which is journaled on the shaft 92. Secured to the upper end of the sleeve 91 is an index plate 93 of any suitable structure. The worm shaft 92 carries an index hand locking lever 94 by means of which the worm shaft 92 can be locked to the sleeve 91 for rotation therewith during cutting and by means of which the worm shaft and blank can be indexed relative to the sleeve 91 after a tooth space has been completely cut. The worm shaft 92 carries a worm 95 which meshes with and drives the worm wheel 96 which is secured to the work spindle 22.

The cradle is rotated in timed relation with the blank rotation during cutting to produce a movement of the blank relative to the tools corresponding to the movement of a gear rolling on the basic gear represented by the tools. This movement of the cradle is effected from the shaft 82 through the miter gears 83 and 101, a shaft 102 which is journaled in the saddle 15, the change gears 103, 104, 105 and 106, the shaft 107 to which the latter gear is secured, the worm 108 mounted thereon and the worm wheel segment 109 which is secured to the cradle. A manual adjustment of the cradle for the purpose of bringing the blank into the proper cutting position may be effected by means of a hand lever 110 which can be engaged with the squared end of the shaft 107. The shaft 85 and gear 84 are mounted in a bracket 111 which swivels on the shaft 82 so as to permit movement of these parts with the cradle. After a tooth space has been completely generated, the cradle is returned to original position preparatory to the generation of a new tooth. This movement may be effected by means external to the machine or by any usual or suitable form of reversing mechanism, the same forming no part of the present invention. The blank may be indexed during the return movement of the cradle or at the beginning or end thereof.

In setting up the machine the blank will be brought into the proper tangential plane for cutting by angular adjustment of the head 21 on the guide arms 20. The tool spindles 34 and 35 will be connected to the levers 48 and 49, respectively, so that the tools cut in the proper parts of the spindle movements and the plates 60 and 61 and the cam 55 will be adjusted, also, for proper cone distance. The cam plates 56 and 57 are made removable so that a curve of any desired form may be cut on the blank. With the machine in operation, the tools are oscillated from the crank shaft 37 while the blank spindle 22 and cradle 18 are moved about their respective axes through the gearing already described. The tools are moved into cutting position for their cutting strokes and relieved from cutting position for their idle strokes by movement of the lever arm 75 and screw shaft 70. The tools are fed into depth by rotation of the nut 67. After one tooth side or pair of tooth sides have been completely generated, the cradle will be reversed to move it to original position and the blank indexed. Before the indexing operation the tools will be moved clear of the blank by reversal of movement of the tool slides through reverse rotation of the crank 71 and nut 67.

Figures 5, 6 and 7 illustrate successive positions of the tools in generating a gear. The tools represent the teeth of an imaginary basic gear as the crown gear 112 shown in dotted lines and trace in their movements the teeth of this crown gear. The generating motion imparted to the blank is a motion as of rolling on this imaginary basic gear. Figure 5 shows the tool T' at the end of its cut with the tool T completely out of the cut. Figure 6 shows the tool T' on its return idle stroke with the tool T in cutting position just about to commence its cut and Figure 7 shows the tool T at the end of its cutting stroke with the tool T' at the end of its idle stroke, each just about to be reversed.

A modified form of apparatus for reciprocating the tool holders on oscillation of the tool arms is shown in Figures 8 and 9. In this case a disc 115 is provided which is secured to the slide 12 coaxial with the spindles 34 or 35 as the case may be. The periphery of this disc 115 may be formed on an involute curve for the active portion of the tool stroke and on a circular arc for the idle portion thereof. The cam 115 may be secured to one of the plates 60 or 61 as the case may be by means of the screws 116. The spindle 34 or 35, as the case may be passes through the bore of the cam and is secured to or formed integral with the arm or guide 32 or 33 as the case may be. The tool holder carries a pair of rollers, one of which 117 is secured to the holder by means of a screw 118 and the other of which 119 is journaled in a sliding piece 120 which is pressed by means of a spring 121 continuously into engagement with the disc 115 to prevent vibration of the tool during the cut. The spring 121 and sliding piece 120 are housed in a bracket which is secured by means of the bolts 122 to the tool holder.

While the present invention has been illustrated in connection with a machine for generating herringbone bevel gears, it will be understood that the principles of the invention are equally applicable to machines for generating herringbone spur and hypoid gears and to the grinding as well as the planing of all these types of gears.

Other modifications of my invention will occur to those skilled in the art. In general, it may be said, that the invention is capable of various further modifications and uses and that this application is intended to cover any adaptations, uses, or embodiments of the invention, following, in general, the principles of the invention and including such departures from the present disclosure as may come within known or customary practise in the gear art and as may be applied to the essential features hereinbefore set forth and as fall within the scope of the invention or the limits of the appended claims.

Having thus described my invention, what I claim is:

1. In a machine for cutting a herringbone gear, a pair of tools adapted to cut from opposite sides of a gear blank to the center of its face, and means for oscillating said tools about axes located, respectively, on opposite sides of a generatrix of the blank, to cause the tools to cut, respectively, portions of the lengthwise tooth curve which are of different hands of curvature.

2. In a machine for cutting a herringbone gear, a pair of tools adapted to cut from opposite sides of a gear blank to the center of its face, means for oscillating said tools about axes located, respectively, on opposite sides of a generatrix of the blank, and means for simultaneously moving said tools toward and from their respective axes of oscillation whereby the tools are moved in other than circular arcs across the face of the blank.

3. In a machine for cutting a herringbone gear, a frame, a pair of tools adapted to cut from opposite sides of the gear blank to the center of its face, a pair of tool arms oscillatably mounted on the frame having their axes so arranged that the tools cut curves of different hands on the blank on oscillation of said arms, a tool holder on which each tool is mounted, each holder being slidable on its arm, means for oscillating the arms and means for simultaneously moving said holders toward and away from their respective axes of oscillation to cause the tools to move in other than circular arcs across the face of the blank.

4. In a machine for cutting a herringbone gear, a frame, a pair of tools adapted to cut from opposite sides of a gear blank to the center of its face, a pair of tool arms oscillatably mounted on the frame having their axes so arranged that the tools cut curves of different hands on the blank on oscillation of said arms, a tool holder on which each tool is mounted, said holders being slidable on their respective arms, a pair of stationary cams, means operatively connecting each tool holder with one of said cams so as to move the tool holder during oscillation of the arms toward and away from their respective axes of oscillation to cause the tools to move in other than circular arcs across the face of the blank and means for simultaneously oscillating said arms.

5. In a machine for cuttting a herringbone gear, a frame, a pair of tool arms oscillatably mounted in the frame, a pair of tools adapted to cut from opposite sides of the gear blank to the center of its face, one of which is secured to each arm, a crank shaft journaled in the frame and provided with a pair of cranks, and means operatively connecting one of said cranks with each tool arm to simultaneously oscillate said tools on rotation of said crank shaft.

6. In a machine for cutting a herringbone gear, a frame, a pair of tool arms oscillatably mounted on the frame, a pair of tools adapted to cut from opposite sides of the gear blank to the center of its face, one of which is secured to each tool arm, a crank shaft provided with a pair of cranks angularly spaced from each other, and means operatively connecting one of said cranks with each tool arm to simultaneously oscillate said tools on rotation of the crank shaft to cause the tools to cut alternately.

7. In a machine for cutting a herringbone gear, a frame, a pair of tool arms oscillatably mounted on the frame, a pair of tools adapted to cut from opposite sides of the gear blank to the center of its face, one of which is mounted on each arm, a crank shaft journaled in the frame, and provided with a pair of cranks, means operatively connecting one of the cranks with each of said tool arms to simultaneously oscillate the tool arms on rotation of the crank shaft, and means for moving the tools toward and from their respective axes of oscillation on oscillation of the tool arms to cause the tools to cut curves other than circular arcs on the blank.

8. In a machine for cutting a tapered herringbone gear, a frame, a slide mounted on the frame, a pair of tool arms oscillatably mounted on the slide, a pair of tools adapted to cut from opposite sides of the gear blank to the center of its face, one of which is secured to each tool arm, a cradle journaled in the frame, a work head angularly adjustable on the cradle to permit adjusting the blank into proper cutting relation with the tools, a work spindle journaled in said head, means for oscillating the tool arms, means for reciprocating the tool slide to feed the tools into depth and periodically withdraw them from engagement with the blank, means for moving the cradle on its axis and for simultaneously rotating the work spindle to generate the tooth profiles, and means for indexing the work spindle during the period the tools are out of engagement with the blank.

HERBERT EDGAR TAYLOR.